Jan. 20, 1931.  W. P. KELLY  1,789,759
COLLAPSIBLE STAKE FOR CARS
Filed Nov. 19, 1929   4 Sheets-Sheet 1
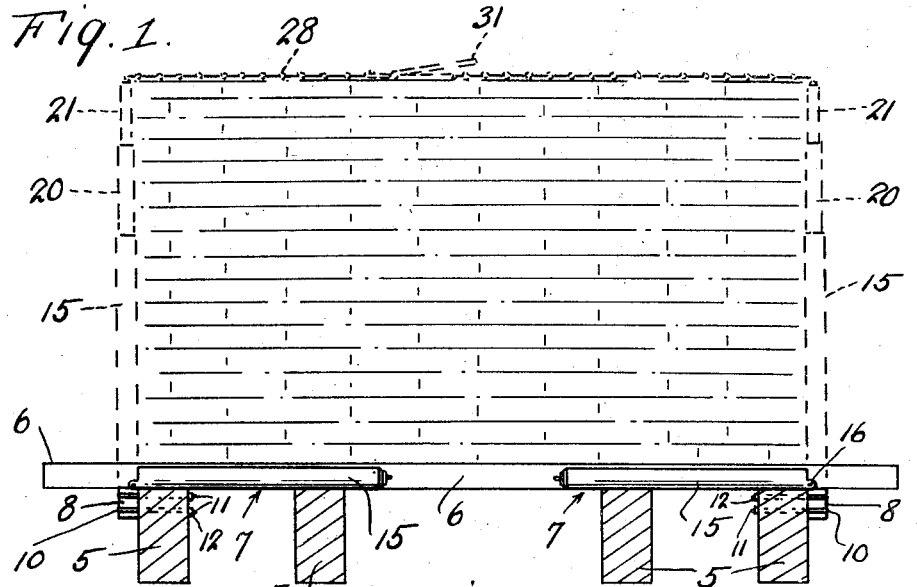
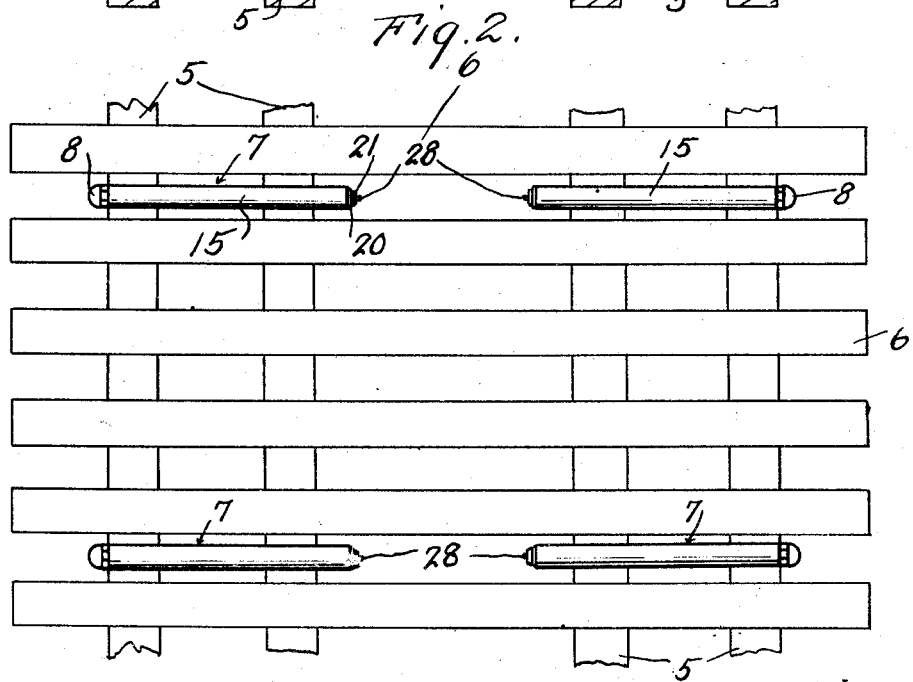
Inventor
William P. Kelly
By Clarence A. O'Brien
Attorney Jan. 20, 1931. W. P. KELLY 1,789,759
COLLAPSIBLE STAKE FOR CARS
Filed Nov. 19, 1929 4 Sheets-Sheet 2

Inventor
William P. Kelly
By Clarence A. O'Brien
Attorney

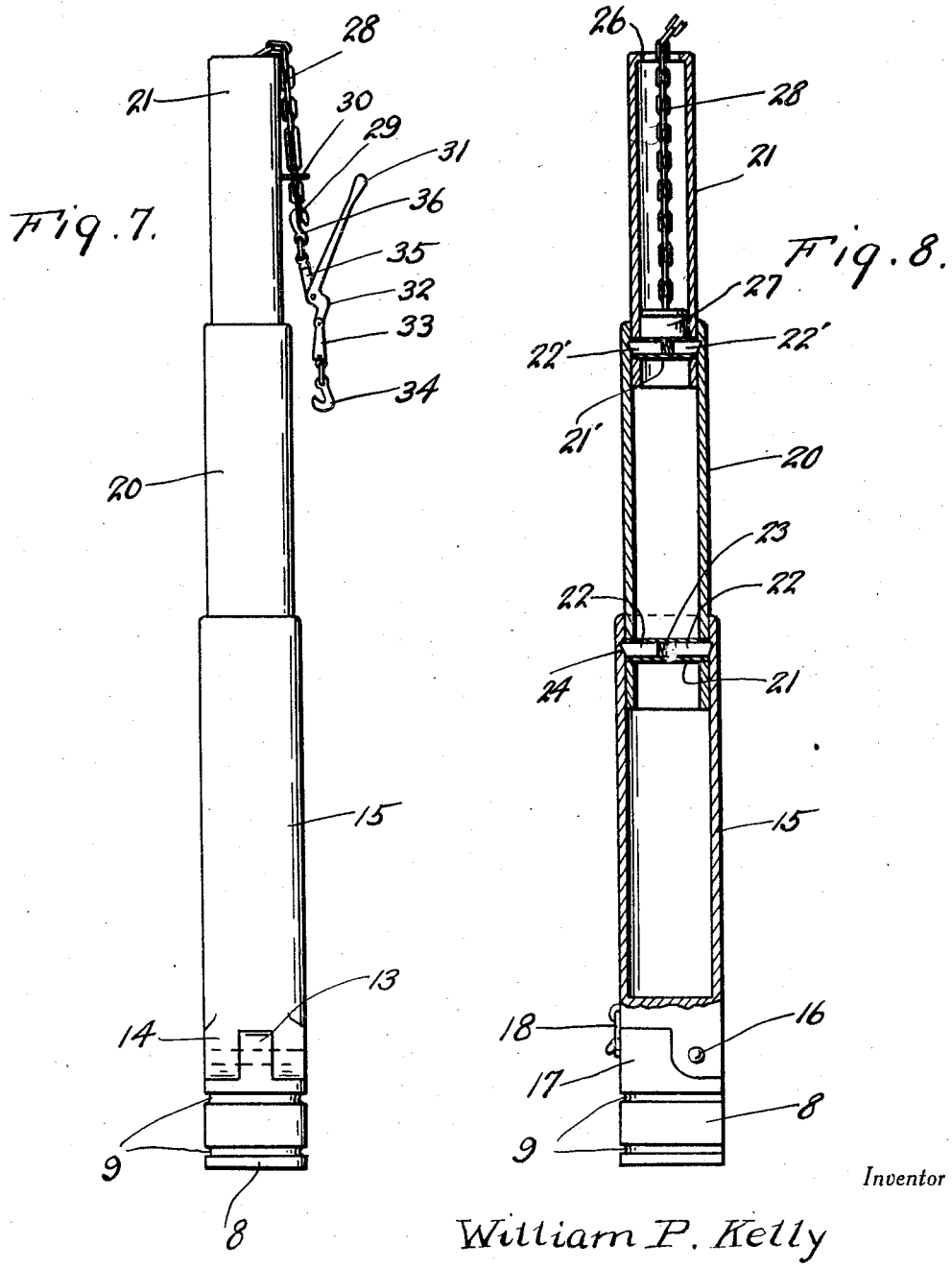

Jan. 20, 1931.  W. P. KELLY  1,789,759
COLLAPSIBLE STAKE FOR CARS
Filed Nov. 19, 1929  4 Sheets-Sheet 4
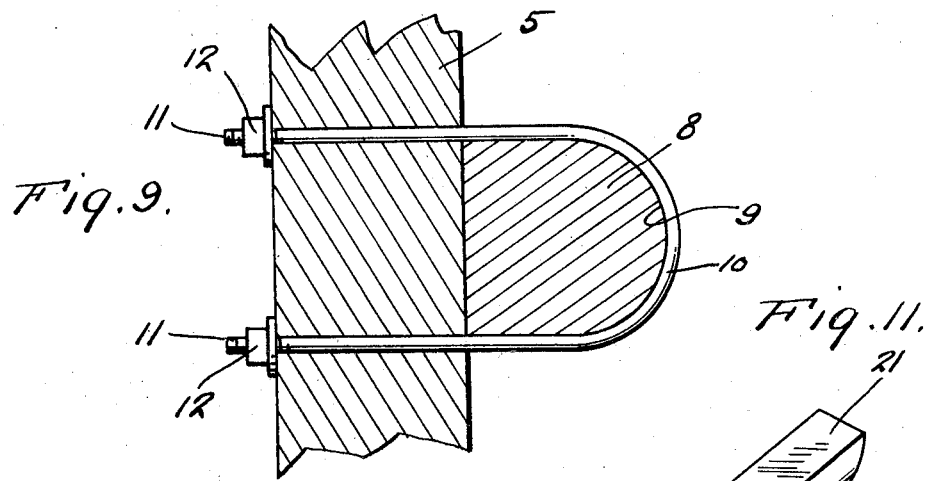
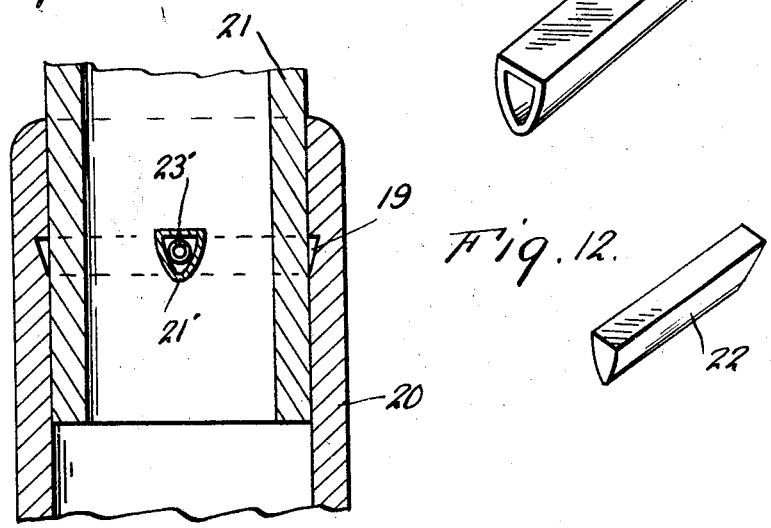
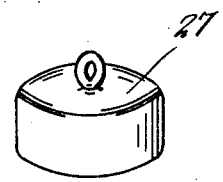
Inventor
William P. Kelly
By Clarence A. O'Brien
Attorney Patented Jan. 20, 1931

1,789,759

UNITED STATES PATENT OFFICE

WILLIAM P. KELLY, OF REEDSPORT, OREGON, ASSIGNOR OF ONE-HALF TO E. MOELLER, OF TOLEDO, OREGON

COLLAPSIBLE STAKE FOR CARS

Application filed November 19, 1929. Serial No. 408,300.

This invention appertains to new and useful improvements in collapsible stakes, particularly adapted for use on railway cars.

The principal object of this invention is to provide a stake which can be disposed in a collapsed position while not in use, and which may be extended and adjusted vertically to accommodate loads of various heights.

In the following specification, other important objects and advantages of the invention will readily become apparent to the reader.

In the drawings:

Figure 1 represents a cross sectional view through a car flooring and showing the improved devices in collapsed position thereon.

Figure 2 represents a fragmentary top plan view of a car equipped with the improved stakes and showing the stakes in collapsed position.

Figure 7 represents a side elevational view of the improved stake in extended position.

Figure 8 represents a longitudinal sectional view through the stake with the sections in extended position.

Figure 9 represents a fragmentary detail sectional view disclosing means for securing the stake to the car.

Figure 10 represents a fragmentary detail sectional view taken on a plane substantially at right angles to the plane on which the sectional view of Figure 5 is taken.

Figure 11 represents a perspective view of the latch guide.

Figure 12 represents a perspective view of one of the latch elements.

Figure 13 represents a perspective view of the weight.

Figure 3:
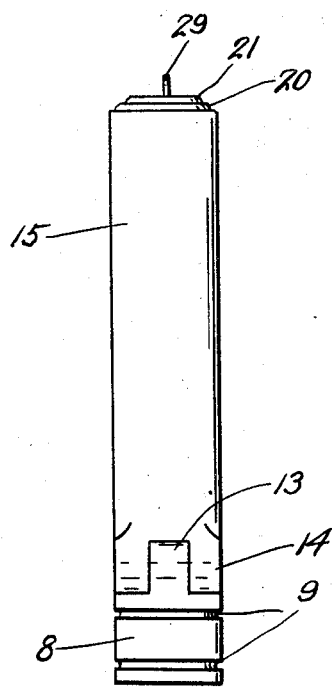
Figure 3 represents a side elevational view of one of the stakes with its sections in collapsed position.
Figure 4:
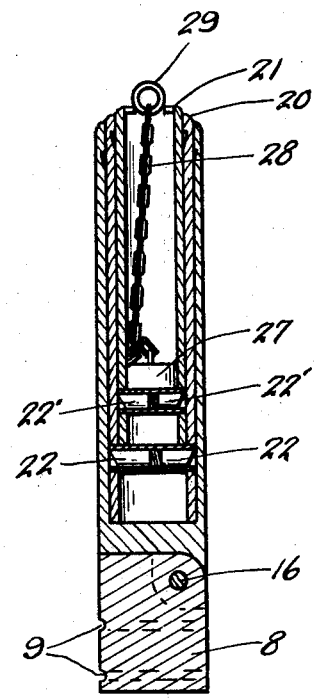
Figure 4 represents a longitudinal sectional view through one of the stakes showing its sections in collapsed position.

Referring to the drawings, wherein like numerals designate like parts, it can be seen that this improved stake may be employed on a railway car, wherein the car structure includes a plurality of longitudinally extending beams 5 which are bridged by the slats 6 composing the flooring.

These slats are in spaced relation and between these slats 6 and secured to the outermost beams 5 are the improved stakes generally referred to by numeral 7.

The improved stake includes a suitable body 8 provided with spaced grooves 9 thereon for receiving the bight portion of a U-bolt 10, the leg portions of which are threaded as at 11 to accommodate nuts 12 after the said threaded portions have been disposed through openings in the corresponding beam 5. The body 8 may thus be secured firmly against the beam 5 as in the manner shown in Figure 9.

The body 8 is also provided with an ear 13 which engages within the bifurcated lower end 14 of the large section 15 of the stake. A pin 16 passes through the furcations of the portion 14 and through the ear 13 to pivotally secure the section 15 to the body 8. The section 15 is indented to receive the abutment 17 on the body 8 so that the section may only swing to a given direction, namely, inwardly toward the intermediate portion of the car-flooring.

Suitable securing means 18 is provided for maintaining the section 15 in an erect position when the stake is to be used. As is clearly shown in Figure 10, the upper end portion of the section 20 is provided at its inner side with a circumferentially extending groove 19.

The intermediate section 20 is open at its opposite end and its lower end is provided with a pair of diametrically opposed openings for receiving the ends of a latch guide 21 of semi-elliptical cross section. Within the latch guide 21 are the bolts 22—22 and a spring 23 is interposed between these bolts for normally tending to urge the same outwardly in opposite directions.

The outer ends of the bolts 22 are bevelled as at 24 and are engageable in the aforementioned groove 19 of the section 15.

Figure 5:
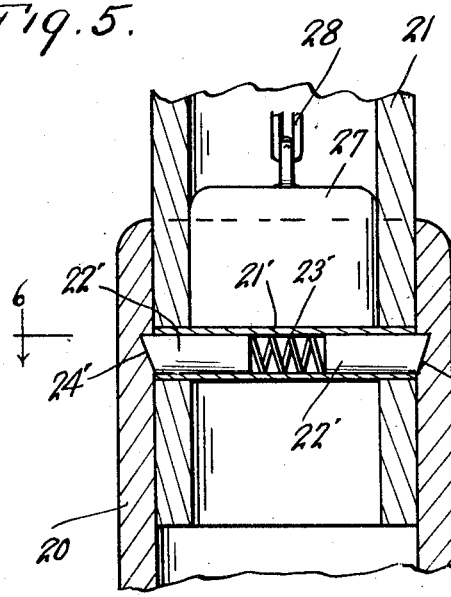
Figure 5 represents a fragmentary enlarged sectional view.
Figure 6:
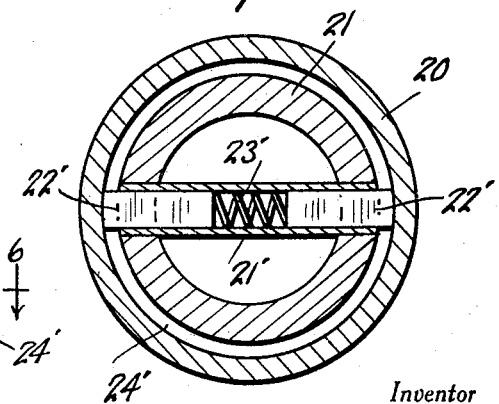
Figure 6 represents a cross sectional view taken substantially on line 6—6 of Figure 5.

The upper or smallest section 21 has its lower end engaging within the section 20 and this end portion of the section 21 is likewise provided with diametrically opposed openings for receiving a tube 21' in which are located the bolts 22'—22', normally projected outwardly through the agency of a spring 23'. As is clearly shown in Figure 5, the ends of these bolts are also bevelled as at 24' for engagement in a groove in the inner side and at the upper end of the section 20.

The upper end of the upper section 21 is flanged inwardly as at 26. Slidable within the upper section 21 is a circular weight 27 to which a chain 28 is secured at one end. This chain is disposed through the upper end of the section 21 and is equipped with a ring 29 at its outer end and a cross member 30 to prevent the outer end of the chain from falling into the section 21, from where it would be difficult to extract the same.

A suitable type of chain stretcher may be used, and by way of example and illustration, Figure 7 discloses a lever 31 having an offset 32 at one end thereof. A link 33 connects a hook 34 to the said offset 32, while a link 35 connects the hook 36 to the lever 31. The hook 36 may be engaged with the ring 29 of the chain 28 while the hook 34 is engaged with the ring 29 of a complementary stake unit so that the chain may assume a taut position over a pile of material in the manner substantially shown in broken lines in Figure 1.

While the foregoing specification sets forth the invention in detail, it is to be understood that various changes in the shape, size, and materials may be resorted to without departing from the spirit and scope of the invention as claimed hereinafter.

Having described the invention, what is claimed as new is:

A stake of the character described comprising a plurality of telescopic sections, and axially movable spring pressed latch bolts between the said sections whereby the sections may be maintained in an extended position and against detachment from each other.

In testimony whereof I affix my signature.

WILLIAM P. KELLY.